United States Patent Office 3,574,844
Patented Apr. 13, 1971

3,574,844
4-[4(OR 5)-IMIDAZOLYLMETHYL]-OXAZOLES
Joseph Francis Gardocki, Doylestown, Pa., Edward Ervin Smissman, Lawrence, Kans., and Joseph Albert Meschino, North Wales, Pa., assignors to McNeil Laboratories, Inc.
No Drawing. Filed Mar. 12, 1969, Ser. No. 806,679
Int. Cl. A61k 27/00
U.S. Cl. 424—272                                    10 Claims

ABSTRACT OF THE DISCLOSURE

4-[4(or 5)-imidazolylmethyl]-oxazole derivatives and compositions useful for their analgesic activity, and method of using same.

---

This invention relates to novel 4-[4(or 5)-imidazolylmethyl]-oxazole derivatives; to novel pharmaceutical compositions, preferably in dosage unit form, comprising a 4-[4(or 5)-imidazolylmethyl]-oxazole derivative as the active ingredient; and to methods of producing analgesia by the use of such derivatives and compositions.

It has been found that 4-[4(or 5)-imidazolylmethyl]-oxazole derivatives of the following formula possess analgesic activity:

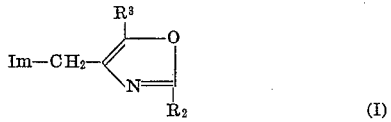

wherein Im represents 1-$R_1$-4(or 5)-imidazolyl in which $R_1$ is a member selected from the group consisting of hydrogen and lower alkyl; and wherein $R_2$ and $R_3$ each represent a member selected from the group consisting of lower alkyl; aryl, preferably, phenyl; trifluoromethyl; heteroaryl, preferably, pyridyl; and aralkyl, preferably, benzyl and phenethyl. The therapeutically active non-toxic acid addition salts of the foregoing compounds are also embraced within the scope of this invention.

As used herein, "lower alkyl" may be straight or branch chained saturated hydrocarbons having from 1 to about 6 carbon atoms, such as, for example, methyl, ethyl, propyl, isopropyl, butyl, pentyl, hexyl and the like alkyls, and also may be cyclic alkyls such as cyclopropyl, cyclobutyl, cyclopentyl and cyclohexyl.

The aforementioned 1-$R_1$-4(or 5)-imidazolyl moiety may be structually illustrated in accordance with the following isomeric forms:

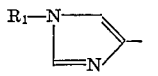 

1-$R_1$-4-imidazolyl          1-$R_1$-5-imidazolyl

The compounds of Formula I may be readily obtained from histidine or N-(lower alkyl) substituted histidine as the starting material, the latter also being denoted as 1-(lower alkyl)-α-amino-4(or 5)-imidazolepropionic acid. It is generally recognized that in histidine, the imidazole hydrogen may be located on either nitrogen. Thus, Merck Index (Eighth Edition, page 532) names histidine as α-amino-4(or 5)-imidazolepropionic acid and, in fact, histidine probably exists as a mixture of both tautomers. 1-(lower alkyl)-α-amino-4(or 5)-imidazolepropionic acid may be readily obtained by alkylation of histidine according to methods reported in the literature, for example, according to the method of H. H. Tallan et al., J. Biol. Chem., 206, 825 (1954).

When it is desired to have the $R_2$ and $R_3$ substituents identical, histidine or N-(lower alkyl) substituted histidine (II) is treated with an appropriate acid anhydride (III) or acyl halide in the presence of a base, e.g., NaOAc, pyridine, under typical Dakin-West reaction conditions to yield the acylamino ketone of Formula IV which may then be treated, preferably under reflux, with a suitable dehydrating agent, such as, for example, acetic anhydride, phosphorous oxychloride, phosphorous pentachloride, p-toluenesulfonic acid, trifluoroacetic anhydride and the like, to effect ring-closure and thereby yield the desired oxazole derivative of Formula I. The acid addition salt of (II) may also be used as the starting material. The foregoing reaction scheme may be illustrated as follows, in which Im, $R_2$ and $R_3$ are as previously described:

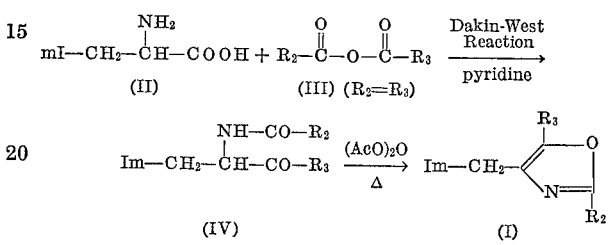

When $R_2$ is not identical with $R_3$, histidine or N-(lower alkyl) substituted histidine (II), in base or salt form, is first acylated with either an acid anhydride of the formula ($R_2CO)_2O$ or an acid halide, preferably the chloride, of the formula $R_2COX$ (X=halo), in a suitable solvent, e.g., water, acetic acid or a chlorinated hydrocarbon such as methylene chloride, chloroform, carbon tetrachloride and the like, at room temperature or below, preferably 0–25° C. to yield the N-acylated product (V). The reaction may also be run in the presence of a suitable base, for example, pyridine, sodium carbonate, sodium hydroxide and the like. The product (V) is in turn reacted with either an acid anhydride of the formula ($R_3CO)_2O$ or an acid halide of the formula $R_3COX$ in pyridine under typical Dakin-West reaction conditions to yield the acylamino ketone product (VI). Treatment of the latter with a dehydrating agent such as previously described affords the desired oxazole derivative of Formula I. Although the foregoing double acylation reaction scheme, which may be illustrated by the following flow diagram, is preferred for those instances when it is desired to have $R_2$ not identical with $R_3$, it is obvious that the double acylation sequence may also be employed to prepare those compounds of Formula I wherein $R_2=R_3$.

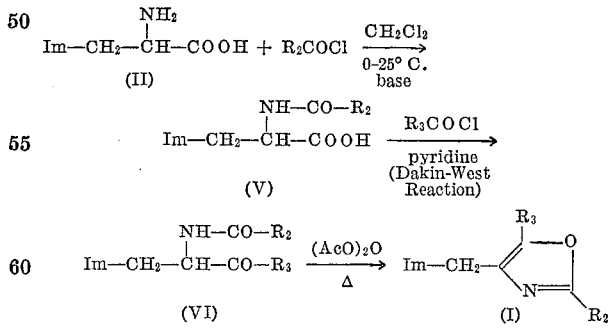

An alternative method of preparing those compounds of Formula V, wherein Im is as previously described and $R_2$ is methyl, is by reacting the starting material of Formula II with ketene ($CH_2=C=O$) in an appropriate solvent, e.g., an aromatic hydrocarbon such as benzene, toluene and the like; dimethylformamide (DMF); and acetic acid.

The oxazole derivatives of Formula I, in base form, may be converted to therapeutically useful acid addition salts by reaction with an appropriate acid, as, for example, an inorganic acid such as hydrohalic acid, i.e., hydrochloric, hydrobromic or hydriodic acid; sulfuric, nitric or thiocyanic acid; a phosphoric acid; or an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicylic, p-aminosalicylic, 2-phenoxybenzoic or 2-acetoxy benzoic acid. The salts are in turn converted to the corresponding free bases in the usual manner, e.g., by reaction with alkali such as sodium or potassium hydroxide.

The 4-[4(or 5)-imidazolylmethyl]-oxazole derivatives of Formula I, including the therapeutically active acid addition salts thereof, possess valuable pharmacological properties. Such compounds are useful as analgesic agents as demostrated by a modification of the well-known Haffner Method [see Branchi and Franceschini, Brit. J. Pharmacol., 9, 280 (1954)]. This modified method comprises placing an arterial clip, the jaws of which are covered with thin rubber tubing, on the base of the tail of a mouse for 30 seconds. If, following oral administration of the drug, the animal does not bit the clip within the allotted period, the drug is considered to have induced an analgesic effect. In contrast, untreated animals always bite the clip when it is placed on the base of the tail. According to this test, analgesic activity is observed with the subject compounds in doses of at least 75–300 mg./kg. body weight.

In view of the analgesic activity of the subject compounds, there is provided herein a method for producing analgesia which comprises administering internally to a warm blooded animal a pharmaceutical composition comprising an analgesically effective amount of a member selected from the group consisting of an oxazole derivative of Formula I and the therapeutically active acid addition salts thereof in admixture with a pharmaceutical carrier.

To prepare the pharmaceutical compositions of this invention, a 4-[4(or 5)-imidazolylmethyl]-oxazole derivative of Formula I or therapeutically active acid addition salt thereof is combined as the active ingredient in intimate admixture with a pharmaceutical carrier according to conventional pharmaceutical compounding techniques, which carrier may take a wide variety of forms depending on the form of preparation desired for administration, e.g., oral, parenteral, etc. In preparing the compositions in oral dosage form, any of the usual pharmaceutical media may be employed, such as, for example, water, glycols, oils, alcohols and the like in the case of oral liquid preparations such as suspensions, elixirs and solutions; or solid carriers such as starches, sugars, lubricants, binders, disintegrating agents and the like in the case of powders, capsules and tablets. Because of their ease in administration, tablets and capsules represent the most advantageous oral dosage unit form, in which case solid pharmaceutical carriers are obviously employed. For parenterals, the carrier will usually comprise sterile water, particularly with the water-soluble salts of Formula I, though other ingredients, for example, to aid solubility or for preservative purposes, may be included. Injectable solutions, for example, may be prepared in which the carrier comprises saline solution, glucose solution or a mixture of both. Injectable suspensions may also be prepared, particularly with the bases of Formula I, in which case appropriate liquid carriers, suspending agents and the like may be employed. The analgesic compositions herein will contain, per dosage unit, e.g., tablet, capsule, powder, injection, teaspoonful and the like, from about 25 to about 500 mg. of the active ingredient, and, preferably, from about 50 to about 250 mg.

Among the preferred pharmaceutical compositions herein are those comprising an analgesically effective amount of a member selected from the group consisting of a 4-[4(or 5)-imidazolymethyl]-oxazole derivative having the formula:

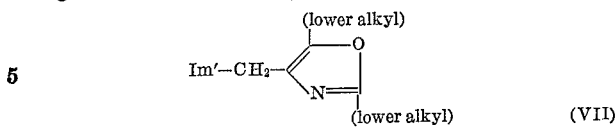

wherein Im' is 4 (or 5)-imidazolyl, and the therapeutically active acid addition salts thereof, in admixture with a pharmaceutical carrier.

In the previously described test for determining analgesic activity, the compounds of Formula VII and salts thereof demonstrate an average block of about 60% or more in the normal response of the tested mice at oral dose levels of about 200–300 mg./kg. body weight. For example, the following results were obtained with 4-[4(or 5)-imidazolylmethyl]-2,5-dimethyloxazole hydrochloride after oral administration to mice in the doses indicated below:

| Oral dose (mg./kg.): | Percent block |
|---|---|
| 300 | 80 |
| 250 | 70 |
| 200 | 60 |
| 150 | 10 |
| 100 | 0 |
| 75 | 10 |
| 50 | 0 |

The oral $ED_{50}$ calculated from these results is 175 mg./kg. body weight. The $LD_{50}$ for 4-[4(or 5)-imidazolylmethyl] - 2,5 -dimethyloxazole hydrochloride has been found to be 1060 mg./kg. The corresponding therapeutic index equals 6.

Many of the compounds embraced within Formula I are novel and, accordingly, they constitute another feature of this invention. Such novel compounds are the 4-[4(or 5)-imidazolylmethyl]-oxazole derivatives of the formula:

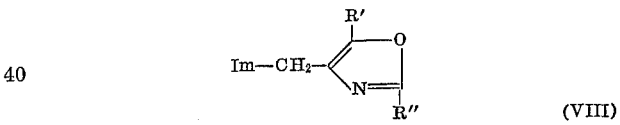

and the therapeutically active non-toxic acid addition salts thereof, wherein Im is as previously described; and wherein R' and R" each represent a member selected from the group consisting of lower alkyl; aryl, preferably, phenyl; trifluoromethyl; heteroaryl, preferably, pyridyl; and aralkyl, preferably, benzyl and phenethyl; provided that at least one of said R' and R" is other than lower alkyl.

The invention may be illustrated by, although not limited to, the following examples.

Example I

4-[4(or 5)-imidazolyl]-3-acetamido-2-butanone hydrochloride

Acetic acid anhydride (141 g., 1.43 moles) and pyridine (94.5 g., 1.19 moles) are added to L-histidme hydrochloride monohydrate (50 g., 0.24 mole). With magnetic stirring the mixture is heated until gas evolution commences (70° C.). External heating is stopped as the temperature rises spontaneously to 100° C. After 5 minutes, gentle heating is applied to maintain the reaction temperature around 90° C. for 15 min. The mixture is allowed to cool. Excess volatile reactants are removed by spin-distillation in vacuo. Trace amounts of volatile reactants are then removed by steam distillation. The resulting aqueous solution is decolorized with activated charcoal. Excess water is removed by spin-distillation in vacuo. The resulting orange gum is dissolved in an equal volume of isopropanol, and seed crystals from a previous reaction are added. The resultant crystallized mass is broken up, and additional isopropanol is added to make a filterable slurry. The crystals are collected and recrystallized twice from hot isopropanol affording 4-[4(or 5)-imidazoyl]-3-acetamido-2-butanone hydrochloride, 35.4 g. (64%): M.P. 165–168° C.

*Analysis.*—Calc'd for $C_9H_{12}N_3O_2Cl$ (percent): C, 46.66; H, 6.09; N, 18.14. Found (percent): C, 46.57; H, 6.31; N, 18.02.

Example II

The procedure of Example I is repeated except that an equivalent quantity of propionic acid anhydride and butyric acid anhydride is used in place of the acetic acid anhydride employed therein to yield, as respective products, 5-[4(or 5)-imidazolyl]-4-propionamido-3-pentanone hydrochloride and 6-[4(or 5)-imidazolyl]-5-butyramido-4-hexanone hydrochloride.

Example III

4-[4(or 5)-imidazolylmethyl]-2,5-dimethyloxazole hydrochloride

4-[4(or 5)-imidazolyl]-3-acetamido-2-butanone hydrochloride (12.3 g., 53 mmoles) is refluxed with stirring in acetic anhydride (100 ml.) for 50 min. The reaction mixture is cooled and crystals of product form. Ether (150 ml.) is then added in portions. The product is collected by filtration, washed with ether and dried in vacuo (60° C.). The dry material is dissolved in 95% ethanol and the resulting solution is decolorized with activated charcoal. The ethanol is removed by spin-distillation in vacuo and the resulting thick gum spontaneously crystallizes. The solid mass is triturated with acetone, filtered and washed with acetone. Recrystallization from an absolute ethanol-acetone mixture furnished 4.5 g. (40%) of 4-[4(or 5)-imidazolylmethyl] - 2,5 - dimethyloxazole hydrochloride, M.P. 161–163° C. An analytical sample of M.P. 163–165° C. is obtained by recrystallization from a chloroform-cyclohexane mixture.

*Analysis.*—Calc'd for $C_9H_{12}N_3OCl$ (percent): C, 50.62; H, 5.66; N, 19.68. Found (percent): C, 50.52; H, 5.99; N, 19.74.

Example IV

By repeating the procedure of Example III, except that an equivalent amount of each product obtained from Example II is substituted for the 4-[4(or 5)-imidazolyl]-3-acetamido-2-butanone hydrochloride used therein, the following products are obtained: 4-[4(or 5)-imidazolylmethyl]-2,5-diethyloxazole hydrochloride and 4-[4(or 5)-imidazolylmethyl] - 2,5 - dipropyloxazole hydrochloride, respectively.

Example V 10,000 hard gelatin capsules, each containing as the active ingredient (A.I.) 250 mg. of 4-[4(or 5)-imidazolylmethyl]-2,5-diethyloxazole hydrochloride are prepared from the following formulation:

| | Grams |
|---|---|
| A.I. | 2,500 |
| Lactose | 1,500 |
| Starch | 400 |
| Talc | 400 |
| Calcium stearate | 10 |

A uniform mixture of the active and supplementary ingredients is prepared and filled into two-piece hard gelatin capsules.

Example VI—Tablets 5,000 compressed tablets, each containing as the active ingredient 50 milligrams of 4-[4(or 5)-imidazolylmethyl]-2,5-dimethyloxazole hydrochloride are prepared from the following formulation:

| | Grams |
|---|---|
| A.I. | 250 |
| Starch | 375 |
| Dibasic calcium phosphate hydrous | 2,500 |
| Calcium stearate | 10 |

The finely powdered ingredients are mixed well and granulated with 10% starch paste. The granulation is dried and compressed into tablets using starch as a disintegrant and calcium stearate as a lubricant.

Example VII—Injectable

The following formulation provides 1 liter of a parenteral solution comprising 25 mg. of 4-[4(or 5)-imidazolylmethyl]-2,5-dimethyloxazole as the active ingredient per milliliter:

| | Grams |
|---|---|
| A.I. | 25.0 |
| Water for injection, U.S.P., q.s. ad 1 liter. | |

The solution is autoclaved to insure sterility and placed into sterile vials. Bacteriostatic agents commonly employed as adjuvants in parenteral solutions may be added to the above formulation.

Example VIII—Oral suspension

The following formulation provides 5 liters of an oral suspension comprising 500 mg. of 4-[4(or 5)-imidazolylmethyl]-2,5-dimethyloxazole as the active ingredient per teaspoonful (5 mls.):

| | Grams |
|---|---|
| A.I. | 500.0 |
| Sucrose | 300.0 |
| Dioctyl sodium sulfosuccinate | 0.5 |
| Bentonite | 22.5 |
| Methyl paraben | 7.5 |
| Propyl paraben | 1.5 |
| Antifoam A.F. emulsion | 0.15 |
| Propylene glycol | 52.0 |
| FD & C Yellow #5 | 0.1 |
| Sodium cyclamate | 50.0 |
| Sodium saccharin | 5.0 |
| Orange flavor | 7.5 |

Filtered purified water, q.s. ad 5 liters.

Dissolve the parabens in the propylene glycol and add this solution to a solution of the sodium cyclamate, sodium saccharin and sucrose in half the water. Suspend the bentonite in hot (about 85° C.) water and stir for 60 minutes. Add the bentonite solution to the former solution.

Dissolve the sulfosuccinate in some water and suspend the A.I. in the resulting solution. Add the Antifoam A.F. Emulsion which has been diluted to a lotion consistency with a minimum amount of water and mix well.

Add the latter suspension of A.I. to the former mixture and mix well. Add the FD & C Yellow #5 dissolved in a small amount of water. Add the orange flavor, q.s. to volume with water, and stir to a homogeneous mixture. Pass the mixture through a colloid mill and fill into suitable containers.

What is claimed is:

1. An analgesic composition comprising an analgesically effective amount of a member selected from the group consisting of a 4-[4(or 5)-imidazolylmethyl]-oxazole derivative having the formula:

$$Im'-CH_2-\underset{\underset{\text{(lower alkyl)}}{|}}{\overset{\overset{\text{(lower alkyl)}}{|}}{\underset{N}{\bigcirc}}}$$

wherein Im' is 4(or 5)-imidazolyl, and a therapeutically active acid addition salt thereof, in admixture with a pharmaceutical carrier.

2. An analgesic composition comprising an analgesically effective amount of a member selected from the group consisting of 4-[4(or 5)-imidazolylmethyl]-2,5-dimethyl-oxazole and a therapeutically active acid addition salt thereof in admixture with a pharmaceutical carrier.

3. An analgesic composition in dosage unit form comprising per dosage unit from about 25 to about 500 mg.

of a 4-[4(or 5)-imidazolylmethyl]-oxazole derivative having the formula:

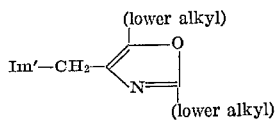

wherein Im′ is 4(or 5)-imidazolyl, or a therapeutically active acid addition salt thereof in admixture with a pharmaceutical carrier.

4. A composition according to claim 3 wherein said dosage unit form is a tablet and said derivative is 4-[4(or 5)-imidazolylmethyl]-2,5-dimethyloxazole.

5. A composition according to claim 3 wherein said dosage unit form is a capsule and said derivative is 4-[4(or 5)-imidazolylmethyl]-2,5-dimethyloxazole.

6. A liquid analgesic composition comprising from about 25 to about 500 mg. per dosage unit of a 4-[4(or 5)-imidazolylmethyl]-oxazole derivative having the formula:

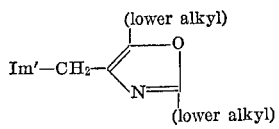

wherein Im′ is 4(or 5)-imidazolyl, or a therapeutically active acid addition salt thereof in a liquid medium suitable for oral administration.

7. A composition according to claim 6 wherein said derivative is 4[4(or 5)-imidazolylmethyl]-2,5-dimethyloxazole.

8. An injectable analgesic composition comprising from about 25 to about 500 mg. per dosage unit of a 4-[4(or 5)-imidazolylmethyl]-oxazole derivative having the formula:

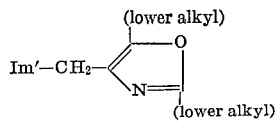

wherein Im′ is 4(or 5)-imidazolyl, or a therapeutically active acid addition salt thereof in a liquid medium suitable for parenteral administration.

9. A composition according to claim 8 wherein said derivative is 4-[4(or 5)-imidazolylmethyl]-2,5-dimethyloxazole.

10. The method for producing analgesia which comprises administering internally to a warm blooded animal a pharmaceutical composition comprising an analgesically effective amount of a member selected from the group consisting of a 4-[4(or 5)-imidazolylmethyl]-oxazole derivative having the formula:

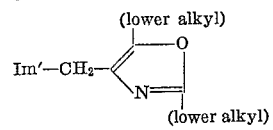

wherein Im′ is 4(or 5)-imidazolyl, and a therapeutically active acid addition salt thereof in admixture with a pharmaceutical carrier.

References Cited

UNITED STATES PATENTS 3,110,650  11/1963  Fischer et al. _____ 424—272
3,279,988  10/1966  Buting et al. _____ 424—272

STANLEY J. FRIEDMAN, Primary Examiner

U.S. Cl. X.R.

260—307

PO-1050
(5/69)

UNITED STATES PATENT OFFICE
CERTIFICATE OF CORRECTION

Patent No. 3,574,844     Dated   April 13, 1971

Inventor(s)  Joseph F. Gardocki et al

It is certified that error appears in the above-identified patent and that said Letters Patent are hereby corrected as shown below:

In Column 1, the third formula should read as follows: 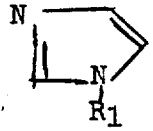

In Column 2, the first formula, that portion reading "mI-CH$_2$" should read -- Im--CH$_2$--.

In Column 4, line 1, "imidazolylmethyl" is misspelled.
  line 58, "histidine" is misspelled.
  line 75, "imidazolyl" is misspelled.

Signed and sealed this 10th day of August 1971.

(SEAL)
Attest:

EDWARD M. FLETCHER, JR.
Attesting Officer

WILLIAM E. SCHUYLER, JR.
Commissioner of Patents